US009409523B2

United States Patent
Cho et al.

(10) Patent No.: US 9,409,523 B2
(45) Date of Patent: Aug. 9, 2016

(54) MULTIBOX FOR VEHICLES

(71) Applicants: Hyundai Motor Company, Seoul (KR); Kia Motors Corporation, Seoul (KR); Dongkook Ind. Co., Ltd., Ulsan (KR); Hyundai Mobis Co., Ltd., Seoul (KR)

(72) Inventors: Phil-Je Cho, Seoul (KR); Ju-Han Shin, Seoul (KR); Tae-Hyun Kim, Ulsan (KR)

(73) Assignees: Hyundai Motor Company, Seoul (KR); Kia Motors Corporation, Seoul (KR); Dongkook Ind. Co., Ltd., Ulsan (KR); Hyundai Mobis Co., Ltd., Seoul (KR)

( * ) Notice: Subject to any disclaimer, the term of this patent is extended or adjusted under 35 U.S.C. 154(b) by 279 days.

(21) Appl. No.: 14/061,665

(22) Filed: Oct. 23, 2013

(65) Prior Publication Data

US 2014/0183896 A1 Jul. 3, 2014

(30) Foreign Application Priority Data

Dec. 31, 2012 (KR) .......................... 10-2012-0157806

(51) Int. Cl.
*B60R 7/06* (2006.01)
(52) U.S. Cl.
CPC ........................................ *B60R 7/06* (2013.01)
(58) Field of Classification Search
CPC .................................. B60R 7/06; E05B 83/30

USPC ................ 296/37.8, 37.12, 24.34; 312/334.1, 312/319.2; 224/483
See application file for complete search history.

(56) References Cited

U.S. PATENT DOCUMENTS 8,328,265 B2 * 12/2012 Danz .......................... 296/37.12

FOREIGN PATENT DOCUMENTS

| JP | 3451036 B2 | 9/2003 |
| JP | 4169603 B2 | 10/2008 |
| JP | 2011-152813 A | 8/2011 |
| KR | 2008-0090977 A | 10/2008 |
| KR | 10-0951864 B1 | 4/2010 |

* cited by examiner

*Primary Examiner* — Stephen Gordon
(74) *Attorney, Agent, or Firm* — McDermott Will & Emery LLP

(57) ABSTRACT

A multibox for vehicles includes a housing, a sliding plate, a cover and a knob unit. The housing has a receiving space for receiving articles. The sliding plate is disposed around the housing to translate forward and rearward by a force of a spring of the housing. The cover finishes a front surface of the receiving space of the housing and is supported on the sliding plate by a hinge structure though hinge arms thereof. The cover is rotated upward and downward by a force of a spring. The knob unit is disposed at one side of a front surface of the housing to lock or unlock the housing and the cover through a pushing operation. The multibox is opened and closed by translation of the sliding plate and rotation of the cover.

10 Claims, 10 Drawing Sheets

--Prior Art--

[ section A-A ]

MULTIBOX FOR VEHICLES

CROSS-REFERENCE TO RELATED APPLICATION

This application claims benefit of priority to Korean Patent Application No. 10-2012-0157806 filed Dec. 31, 2012, the entire contents of which are hereby incorporated by reference.

TECHNICAL FIELD

The present inventive concept relates to a multibox for vehicles. More particularly, the present inventive concept relates to a multibox installed above a globe box to secure a receiving space in the vehicle.

BACKGROUND

A multibox for vehicles is a receiving box installed above a globe box formed on a side of an instrument panel (I/P) of a vehicle to secure a large receiving space.

The multibox is adapted to preserve small articles used while driving a vehicle, and is generally rotatably installed on a front surface of a crash pad such that articles can be introduced into or extracted from a receiving unit by opening the crash pad forward if necessary.

For example, the multibox has a receiving unit therein. A front surface of the box body is finished with a cover for opening or closing the receiving unit, and a locking unit is provided between the inner surface of the cover and the crash pad to control an opening/closing operation of the cover.

Various types of such multiboxes are disclosed in Japanese Patent No. 4169603, Japanese Patent No. 3451036, Japanese Patent Application Publication No. 2011-152813, and Korean Patent No. 951864.

FIG. 1 shows an example of a multibox, and shows an opened state and a closed state of the multibox.

When the multibox 100 is unlocked by adjusting a knob 110 on a front surface thereof, the multibox is rotated about a hinge unit (not separately shown) to be rotated and opened downward.

However, since the multibox according to the prior art is rotated and opened by using a simple hinge structure, a parting line 120 at a lower end thereof has a downwardly opened shape to avoid interference, which is disadvantageous in its outer appearance. For example, an operational force is applied excessively when the multibox is closed, which causes inconvenience. Further, since the multibox is opened while being rotated downward, a behavior of a passenger is hampered.

SUMMARY

The present inventive concept relates to a multibox for vehicles which has a multibox opening/closing mechanism by which a cover can be opened and closed while translating and rotating when the multibox is opened and closed, thereby improving a freedom of degree of design and an outer appearance of the multibox due to securing of a neat parting line on a front surface of the interior of the vehicle. Further, since the multibox is rotated upward when being opened, no inconvenience is caused to a behavior of a passenger. In addition, an operational force of the cover is minimized when the cover is closed.

In order to achieve the above object, an aspect of the present inventive concept encompasses a multibox for vehicles including a housing, a sliding plate, a cover and a knob unit. The housing is disposed on an inner side of a front surface of a crash pad and has a receiving space therein and a wound spring at an upper portion thereof. The sliding plate is disposed around the housing and connected to the wound spring of the housing to translate forward and rearward by a force of a spring of the housing. The cover finishes a front surface of the receiving space of the housing and is supported on the sliding plate by a hinge structure though hinge arms thereof. The cover is rotated upward and downward by a force of a rotation spring disposed on the hinge unit. The knob unit is disposed at one side of a front surface of the housing to lock or unlock the housing and the cover through a pushing operation. Thus, the multibox is opened and closed by translation of the sliding plate and rotation of the cover.

Here, the sliding plate may include a pair of guide gears rotatably engaged with gear rails disposed at upper portions of the housing to guide forward and rearward translation of the sliding plate. Then, the opposite guide gears in the sliding plate may be connected to each other by a balance shaft to be rotated together.

Further, the cover may be rotatably engaged with arc-shaped gear rails disposed on a side surface of the sliding plate using the guide gears in the hinge arms to be guided during rotation thereof.

In an embodiment of the present inventive concept, a balance shaft and balance gears disposed on opposite ends of the balance shaft to be movably engaged with the balance gear rails at upper portions of the housing may be provided at an upper portion of the sliding plate, whereby the translation of the sliding plate can be balanced on the left and right sides thereof.

In another embodiment of the present inventive concept, the multibox for vehicles may further include a position regulating pin as a unit for regulating rotation of the cover when the sliding plate translates. The position regulating pin may be disposed on a side surface of the sliding plate while being resiliently supported by a spring such that a position of the position regulating pin can be varied inward and outward along a cam guide on a side surface of the housing and can regulate rotation of the cover while being selectively inserted into a position regulating aperture in a hinge arm of the cover at the same time.

Accordingly, a multibox for vehicles according to the present inventive concept has the following advantages.

First, since a cover of the multibox is opened and closed while translating and rotating, an interference with a peripheral crash pad can be effectively eliminated. Thus, a parting line of the multibox installed on a front surface of the interior of the vehicle can be neatly finished. Accordingly, a degree of freedom of design and an excellent outer appearance can be secured.

Second, since the cover is opened and closed while being rotated upward, no inconvenience is caused to a behavior of a passenger.

Third, since the cover is pushed inward while being lowered when the cover is closed, an operational force thereof is minimized and a closing operation is very convenient.

Fourth, since the number of components is small and the structure of the multibox is simple, an accumulated tolerance can be easily managed.

BRIEF DESCRIPTION OF THE DRAWINGS

The above and other features of the present inventive concept will now be described in detail with reference to certain exemplary embodiments thereof illustrated the accompanying drawings which are given hereinbelow by way of illustration only, and thus are not limitative of the present inventive concept.

Figure 1:
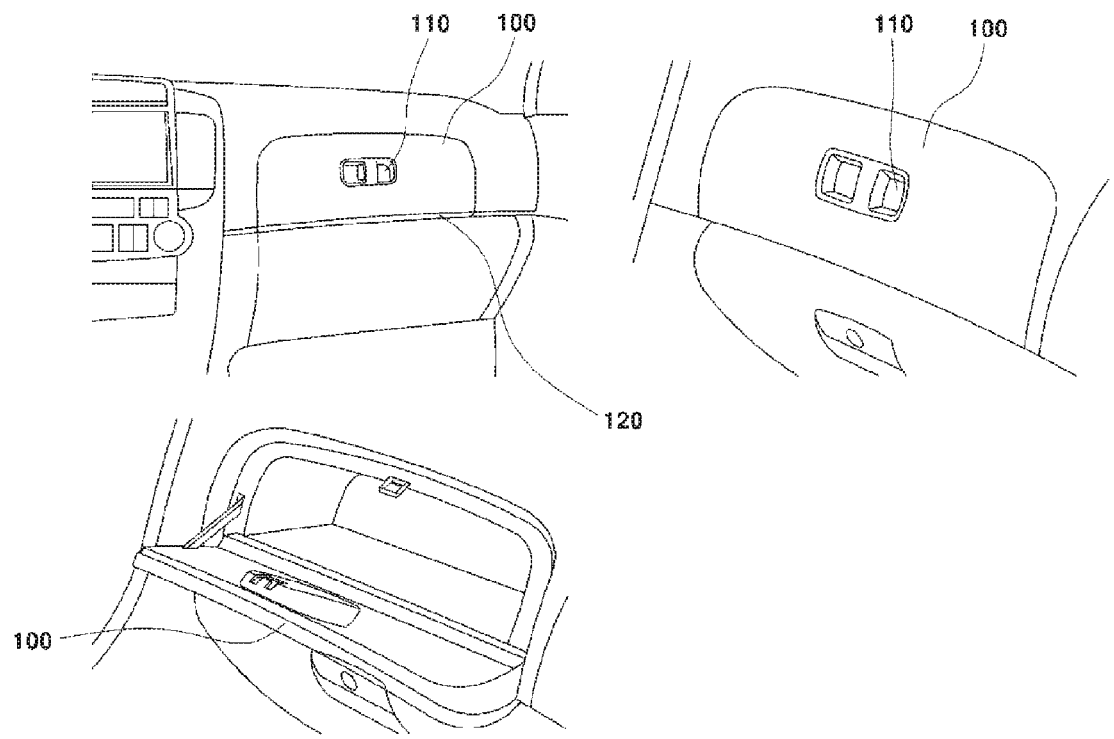
FIG. 1 shows a perspective view of a multibox for vehicles according to the related art.

It should be understood that the appended drawings are not necessarily to scale, presenting a somewhat simplified representation of various features illustrative of the basic principles of the inventive concept. In the figures, reference numbers refer to the same or equivalent parts of the present inventive concept throughout the several figures of the drawing.

DETAILED DESCRIPTION

Hereinafter, the present inventive concept will be described in detail with reference to the accompanying drawings.

Figure 2:
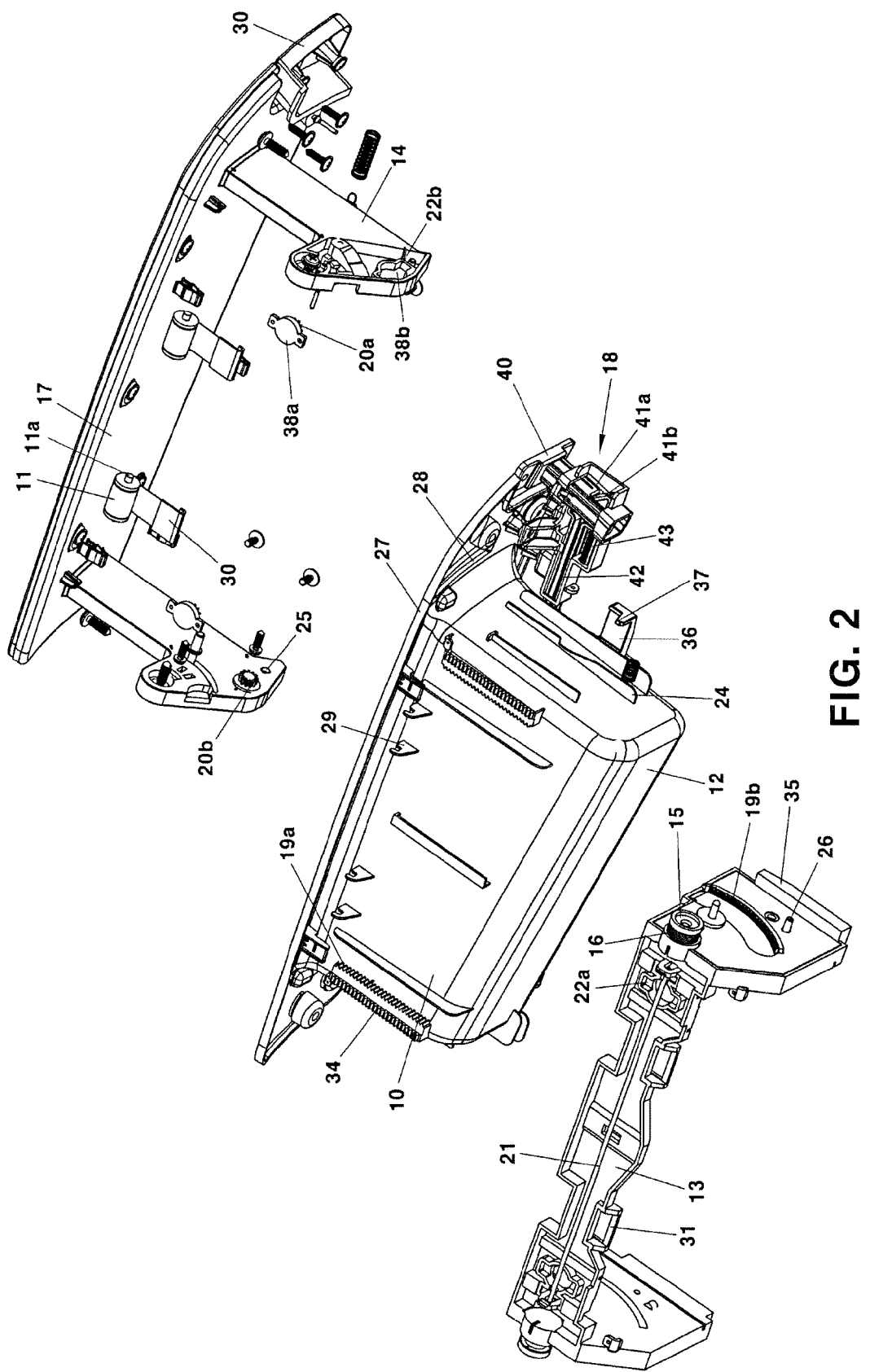
FIG. 2 is an exploded perspective view showing a multibox for vehicles according to an embodiment of the present inventive concept.
Figure 3A:
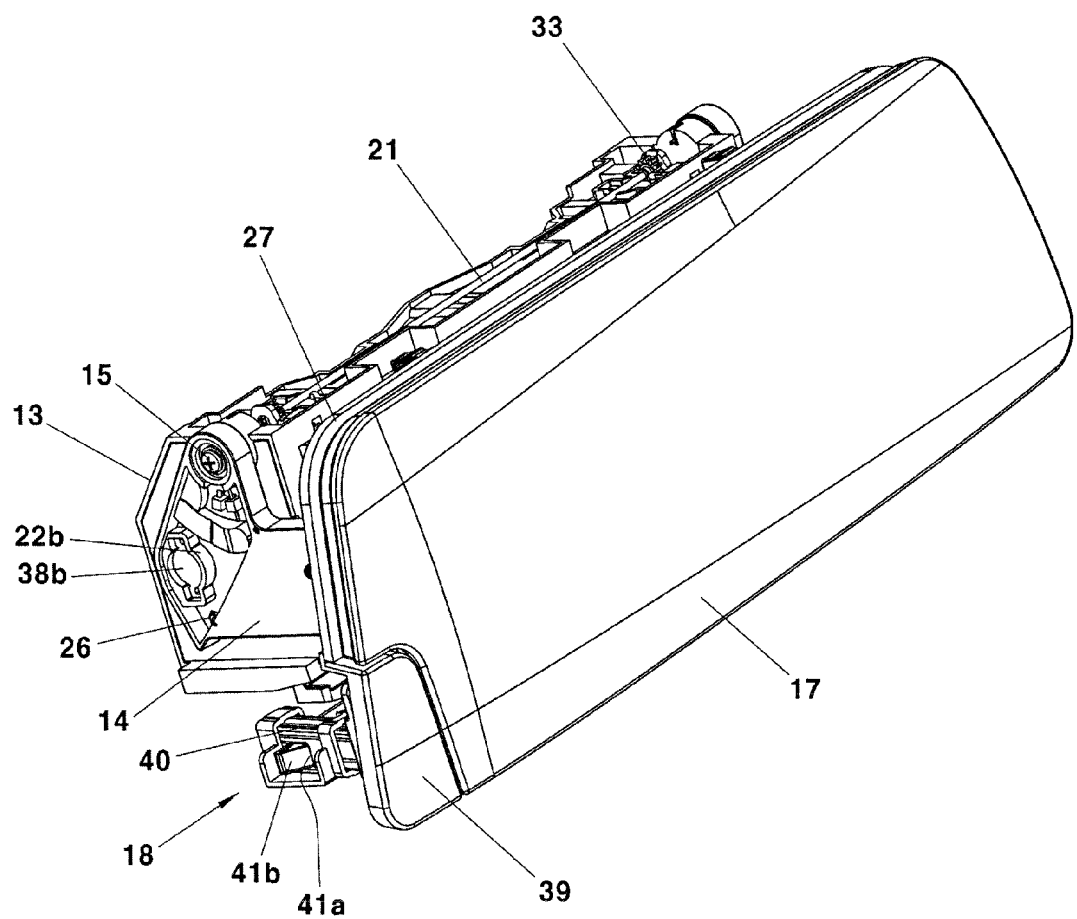
FIGS. 3A and 3B are perspective views showing an assembly state of a multibox for vehicles according to an embodiment of the present inventive concept.
Figure 3B:
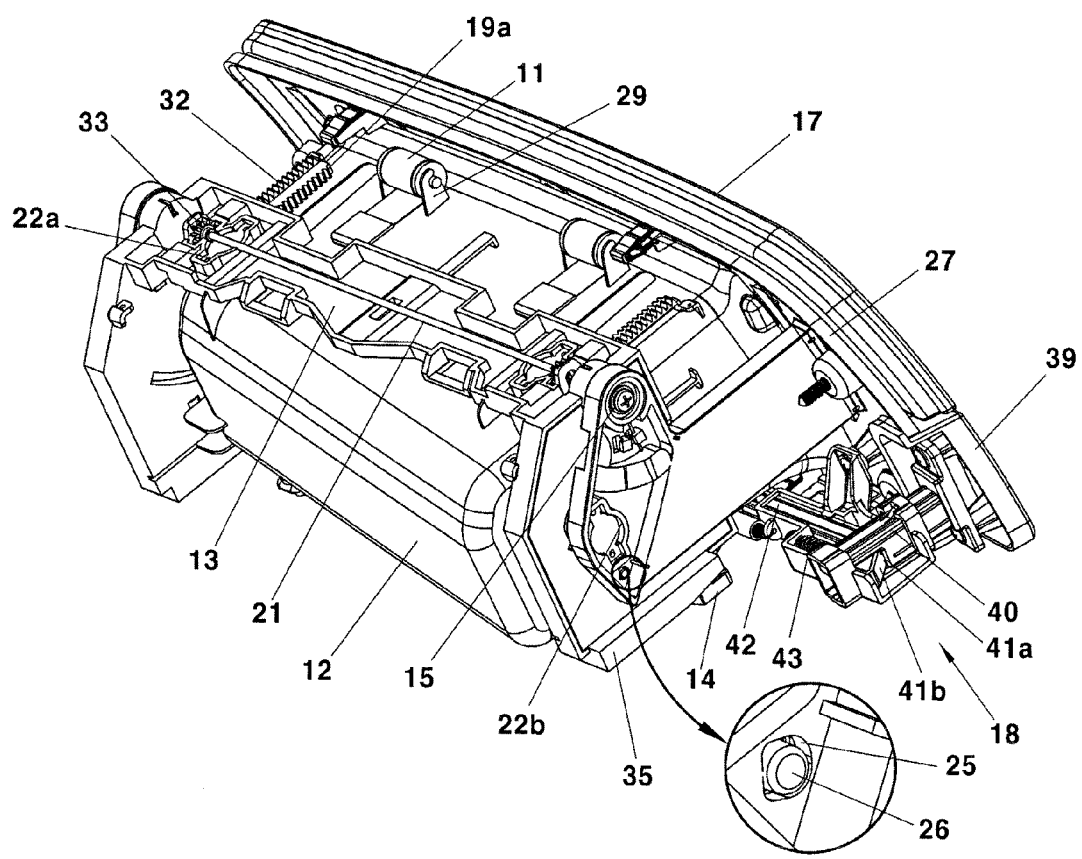

FIG. 2 is an exploded perspective view showing a multibox for vehicles according to an embodiment of the present inventive concept. FIGS. 3A and 3B are perspective views showing an assembly state of a multibox for vehicles according to an embodiment of the present inventive concept.

As shown in FIGS. 2, 3A, and 3B, a multibox for vehicles may be pushed out upward to be opened by using a combination of a sliding plate (e.g., sliding plate 13) which translates while linearly moving forward and rearward and a cover (e.g., a cover 17) which rotates while moving upward and downward.

To this end, a housing 12 having a receiving space 10 into which articles can be introduced may be provided to be inserted and installed inside a crash pad while forming a parting line at a front opening of the crash pad by using a flange 27 at a front periphery of the housing 12.

Cutaway apertures 28 may be formed at opposite sides of the flange 27 of the housing 12 such that hinge arms 14 of the cover 17, which will be described below, are inserted into the cutaway apertures 28 and located inside the cutaway apertures 28.

A wound spring 11 may be provided in the housing 12 as a unit for compulsorily extracting the sliding plate 13, which will be described below, in which case the wound spring 11 applies a force of always pulling the sliding plate 13 in an extraction direction by using a band-shaped plate spring wound to have elasticity.

For example, the wound spring 11 may be rotatably installed in a spring bracket 29 formed at an upper portion of the housing 12 by using opposite shafts 11a of the spring bracket 29. Referring to FIG. 2, a hook 30 at an end of the wound spring 11 can be caught by a catch 31 formed in a transverse member of the sliding plate 13.

Thus, when the sliding plate 13 is unlocked such that a constraining force disappears, the wound spring 11 may be wound to pull the sliding plate 13 so that the sliding plate 13 translates.

The sliding plate 13 may have a transverse member and opposite longitudinal members which are integrally formed. The sliding plate 13 may be installed to surround an upper side and opposite lateral sides of the housing 12 to translate forward and rearward.

Referring to FIG. 2, guide gears 20a may be provided at two upper portions of the sliding plate 13 such that the sliding plate 13 can be guided by the guide gears 20a while the sliding plate 13 translates.

Arc-shaped gear rails 19b may be formed at opposite sides of the sliding plate 13 such that guide gears 20b mounted to the hinge arms 14 of the cover 17 can be engaged with the guide rails 19b.

Since lock housings 35 each having a stopper recess (34 of FIG. 4) may be integrally formed at side lower ends of the sliding plate 13 such that stopper bosses 37 at lock rods 36 of a knob unit 18 can be stopped by the stopper recesses 34 of the lock housings 35, and a forward movement (extraction) of the sliding plate 13 can be constrained.

In particular, a balance unit may be provided as a unit for moving the sliding plate 13 while left and right sides of the sliding plate 13 are balanced when the sliding plate 13 translates.

To this end, a balance shaft 21 may be disposed parallel to the sliding plate 13 along a left and right lengthwise direction thereof and opposite ends of the balance shaft 21 may be supported by the sliding plate 13, and balance gears 33 may be mounted to opposite ends of the balance shaft 21, respectively.

Referring to FIG. 3B, the opposite balance gears 33 can be rotatably engaged with opposite balance gear rails 32 formed in parallel in a forward and rearward widthwise direction of the housing 12 at an upper side of the housing 12, that is, the balance gear rails 32 stuck to gear rails 19a, which will be described below, while teeth thereof face upward.

Thus, since the opposite balance gears 33 which is rotated together with the balance shaft 21 during translation of the sliding plate 13 roll along the balance gear rails 32, the sliding plate 13 can linearly translate while the left and right sides thereof are balanced.

The cover 17 may be a unit for opening and closing the receiving space 10 while finishing a front surface of the housing 12, and two opposite hinge arms 14 may extend from a rear surface of the cover 17 by a predetermined length.

Rear upper ends of the hinge arms 14 of the cover 17 may be supported by hinge units 15 having hinge pins at upper ends of side surfaces of the sliding plates 13, respectively, and accordingly, the cover 17 can be rotated upward and downward about the hinge units 15 acting as a center axis.

Then, rotation springs 16 may be mounted to the hinge units 15, respectively, such that the cover 17 is subjected to a force of always pulling out the cover 17 upward by a force of the rotation springs 16.

That is, when the cover 17 is released from regulations of position regulating pins 26, which will be described below, the cover 17 may be rotated by a spring force to be pulled out upward.

The knob unit 18 for releasing a lock between the housing 12 and the cover 17 through a pressing operation may be provided at one side of a front lower end of the housing 12, and the knob unit 18 will be described below.

Figure 4:
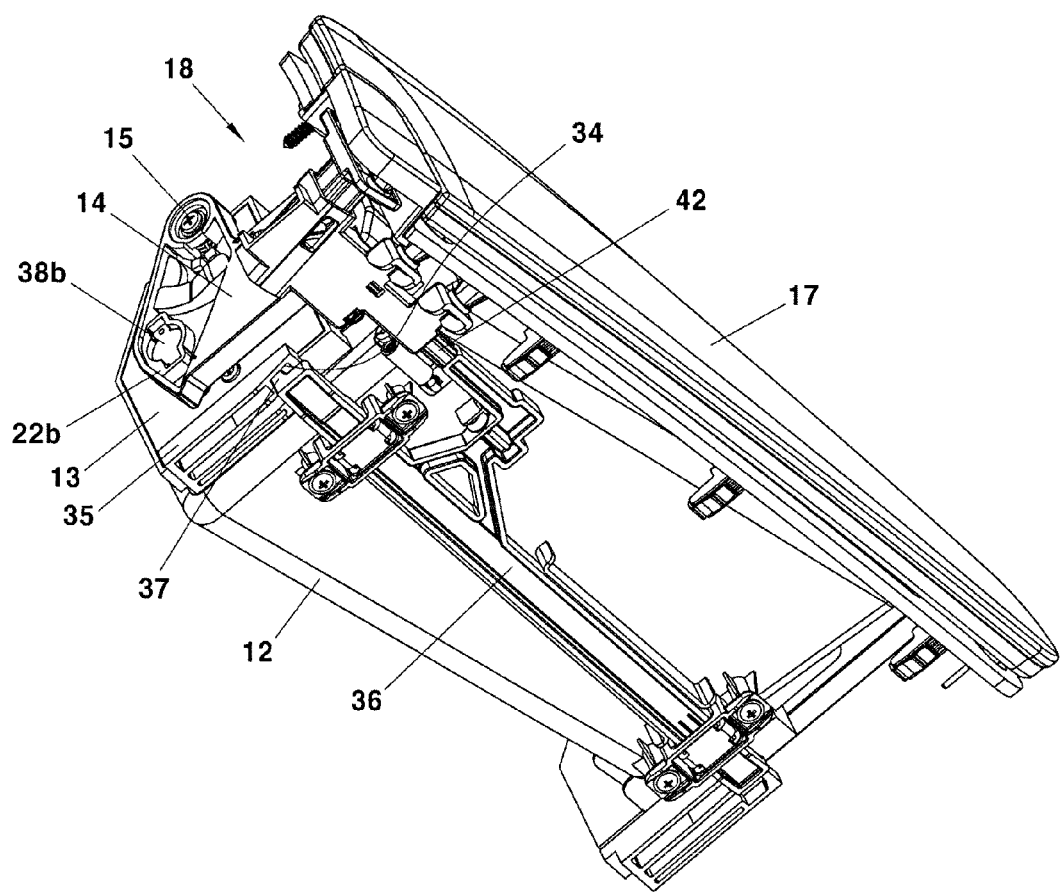
FIG. 4 is a perspective view showing a knob unit in a multibox for vehicles according to an embodiment of the present inventive concept.

FIG. 4 is a perspective view showing a knob unit in a multibox for vehicles according to an embodiment of the present inventive concept.

As shown in FIGS. 3B and 4, the knob unit 18 may include a knob 40 having a knob cover 39 on a front surface thereof to slide forward and downward, a connecting rod 42 which can slide leftward and rightward while contacting the knob 40 through inclined surfaces 41a and 41b thereof, a knob spring 43 (also see FIG. 2) resiliently supporting the connecting rod 42 in one direction, and a lock rod 36 connected to an end of the connecting rod 42 and supported on a bottom surface of the housing 12 to slide along a left and right lengthwise direction thereof.

Then, as shown in FIG. 4, since a stopper boss 37 may be formed at one end of the lock rod 36 to be stopped in the stopper recess 34 of the lock housing 35 in the sliding plate 13, the entire sliding plate 13 may be constrained by the lock rod 36, that is, the knob unit 18.

Referring to FIG. 3B, opposite ends of the knob spring 43 (see FIG. 3B) may be supported between the housing 12 and the connecting rod 42, and always apply a force of always pushing the connecting rod 42 in one direction, that is, in a direction in which the stopper boss 37 and the stopper recess 34 are stopped by each other.

Accordingly, when a user pushes the knob cover 39, the stopper boss 37 may be released from the stopper recess 34 by the operation force of the knob cover 39 as the knob 40 is moved forward and rearward, the connecting rod 42 may be moved leftward and rightward due to contact power transmission between the inclined surfaces 41a and 41b, and the lock rod 36 connected to the connecting rod 42 may be moved leftward and rightward, so that the slide plate 13 is released and is slid forward to translate.

Of course, when the cover 17 is closed again, the stopper boss 37 of the lock rod 36 located in a forward and rearward progress locus of the stopper recess 34 in the lock housing 35 of the sliding plate 13 may be stopped again by the stopper recess 34 of the lock housing 35 which moves rearward together with the sliding plate 13 so that the constraint of the sliding plate 13 can be maintained.

Figure 5:
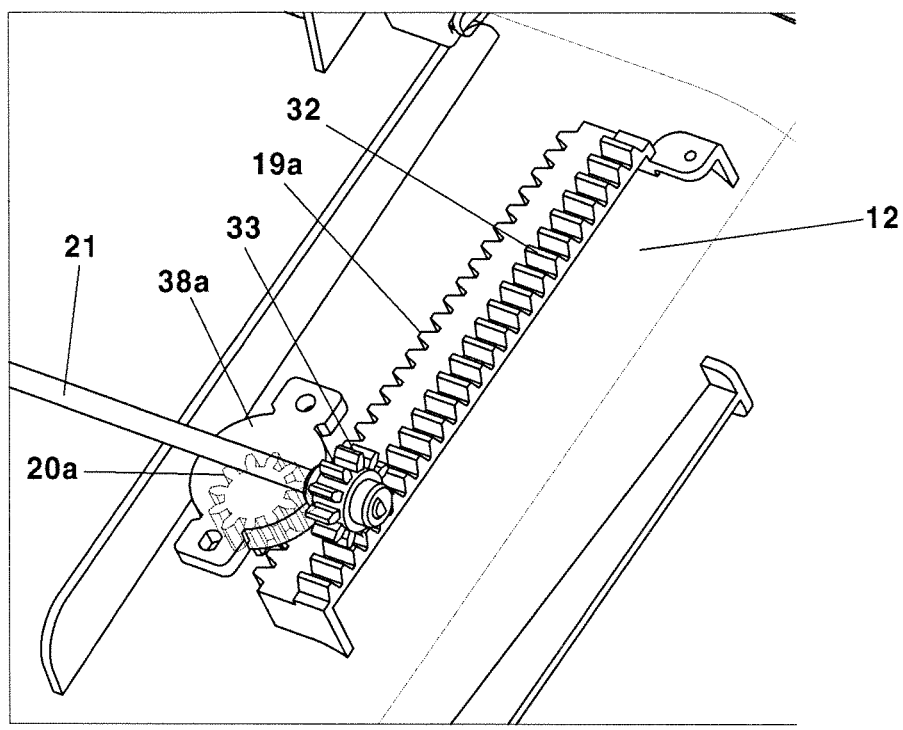
FIG. 5 is a perspective view showing a guide unit of a sliding plate in a multibox for vehicles according to an embodiment of the present inventive concept.

FIG. 5 is a perspective view showing a guide unit of a sliding plate in a multibox for vehicles according to an embodiment of the present inventive concept.

FIG. 5 shows the gear rail 19a and the guide gear 20a which stably serve to the translation of the sliding plate 13.

The gear rails 19a may be installed in parallel along a forward and rearward direction of the housing 12 at opposite upper sides of the housing 12, and the left and right guide gears 20a forming a pair may be coupled within gear mounting units 22a provided at upper portions of the sliding plate 13 while being assembled in gear housings 38a.

Accordingly, when the sliding plate 13 translates, the guide gears 20a in the sliding plate 13 may be engaged with the gear rails 19a in the housing 12 to be moved, so the sliding plate 13 can stably translate.

Then, the gear housings 38a in which the guide gears 20a are accommodated may be damper housings filled with oil, such that the translation speed of the sliding plate 13 is slowly controlled as the gears receives resistance of the oil during the rotations thereof.

Figure 6:
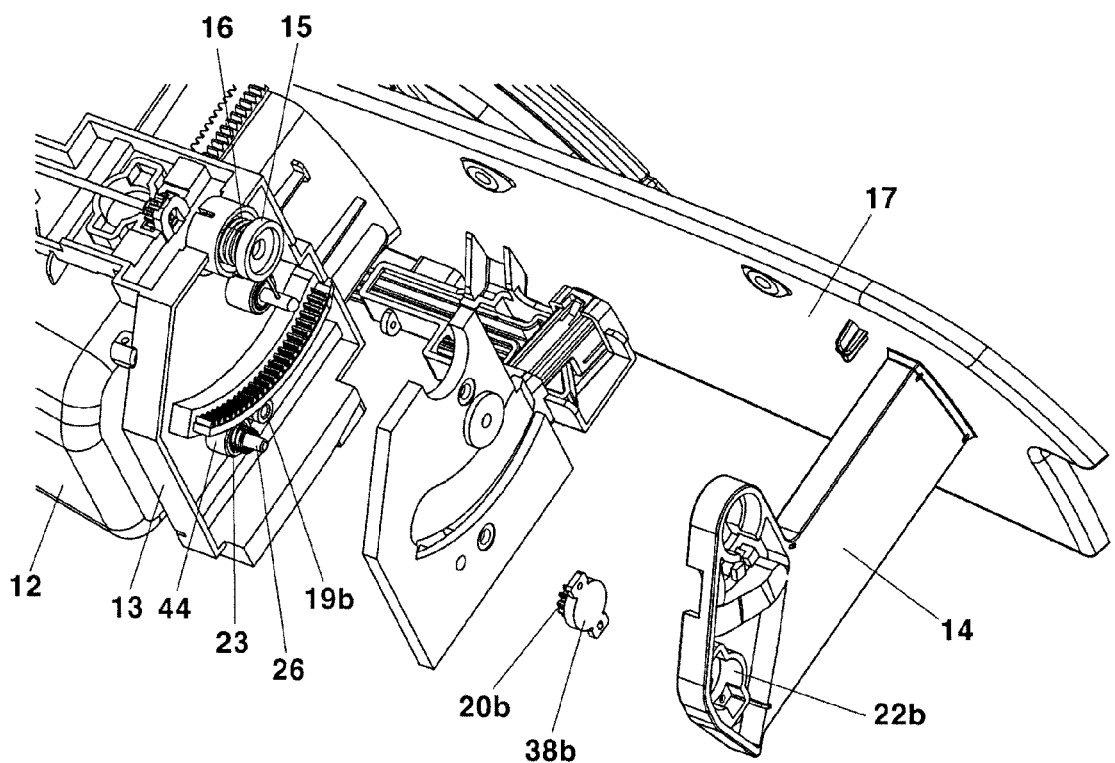
FIG. 6 is a perspective view showing a guide unit of a cover in a multibox for vehicles according to an embodiment of the present inventive concept.

FIG. 6 is a perspective view showing a guide unit of a cover in a multibox for vehicles according to an embodiment of the present inventive concept.

As shown in FIG. 6, a gear mounting unit 22b may be formed at a lower side of a rear end of the hinge arm 14 of the cover 17, and a gear housing 38b accommodating the guide gear 20b may be mounted to the gear mounting unit 22b.

The arc-shaped gear rails 19b may be formed at opposite lateral sides of the sliding plate 13, and the guide gears 20b at the hinge arms may be engaged with the gear rails 19b.

Thus, as the guide gears 20b at the hinge arms 14 of the cover 17 are engaged with the gear rails 19b in the sliding plate 13 to roll during the rotation of the cover 17, the cover 17 can be stably rotated.

In this case, Then, the gear housings 38b in which the guide gears 20b are accommodated may be damper housings filled with oil, such that the rotation speed of the cover 17 is slowly controlled as the gears receives resistance of the oil during the rotations thereof.

Figure 7:
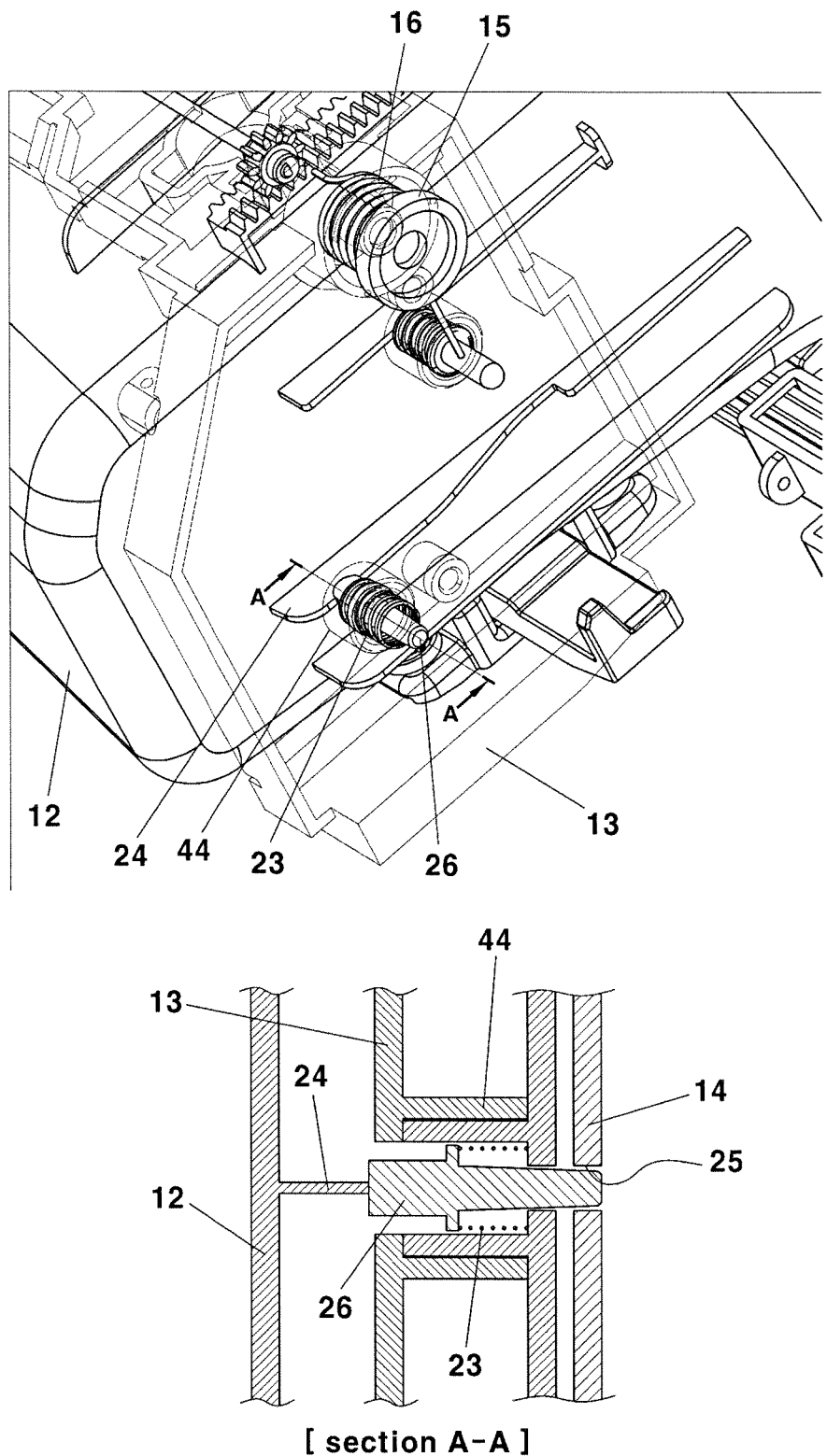
FIG. 7 is a perspective view showing a rotation regulation unit of the cover in a multibox for vehicles according to an embodiment of the present inventive concept.

FIG. 7 is a perspective view showing a rotation regulation unit of a cover in a multibox for vehicles according to an embodiment of the present inventive concept.

FIG. 7 shows a unit for regulating rotation of the cover 17 when the sliding plate 13 translates.

A position regulating pin 26 and a spring 23 resiliently supporting the position regulating pin 26 inward may be inserted into a pin housing 44 formed at a lateral side of the sliding plate 13, and one end of the position regulating pin 26 can contact the cam guide 24 formed at a lateral side of the housing 12 and an opposite end thereof can be inserted into a position regulating aperture 25 formed at the hinge arm 14 of the cover 17.

In this case, the height of the cam guide 24 may become gradually lower as it goes from a rear side to a front side of the housing, and the inward and outward position of the position regulating pin 26 progressing while contacting the cam guide 24 may be varied.

That is, when the position regulating pin 26 is positioned at a rear high location of the cam guide 24, an outer end of the position regulating pin 26 may be inserted into the position regulating aperture 25, and when the position regulating pin 26 is positioned at a front lower location of the cam guide 24, an outer end of the position regulating pin 26 may receives a force of the spring 23 to be extracted from the position regulating aperture 25.

Accordingly, since the position regulating pin 26 is moved while being inserted into the position regulating aperture 25 of the hinge arm 14 when the sliding plate 13 is moved forward, rotation of the cover 17 can be regulated while the sliding plate 13 translates, and the position regulating pin 26 may be extracted to release regulation of the cover 17 at a time point when the translation of the sliding plate 13 ends (a time point when the position regulating pin is positioned at a front low location of the cam guide 24), when the cover 17 can be rotated.

Figure 8:
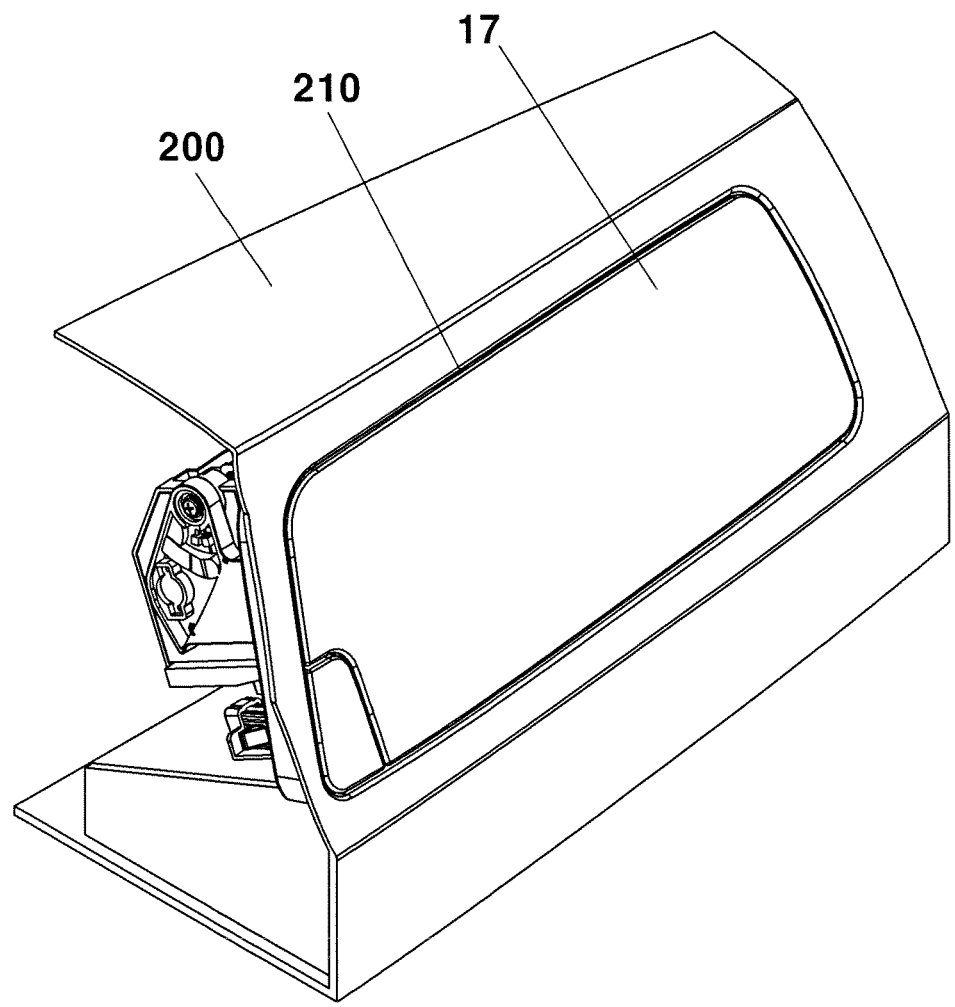
FIG. 8 is a perspective view showing an installation state of a multibox according to an embodiment of the present inventive concept.

FIG. 8 is a perspective view showing an installation state of a multibox according to an embodiment of the present inventive concept.

As shown in FIG. 8, the multibox may be generally installed on a crash pad 200 on a front side of a passenger seat, and almost all parts of the multibox except for the cover 17 may be received in the crash pad 200.

Here, a front surface of the cover 17 can be maintained on the same plane as the front surface of the crash pad 200, a parting line 210 formed along the periphery of the cover 17 may be located at a center of the foaming part of the crash pad 200 to form a clear parting line without any gap or step.

That is, since the multibox is an opened/closed cover using rotation following translation, an interference with the crash pad 200 may not need be considered. Accordingly, since the multibox is opened by the translation to avoid interference, a clear parting line of the multibox can be secured.

Figure 9:
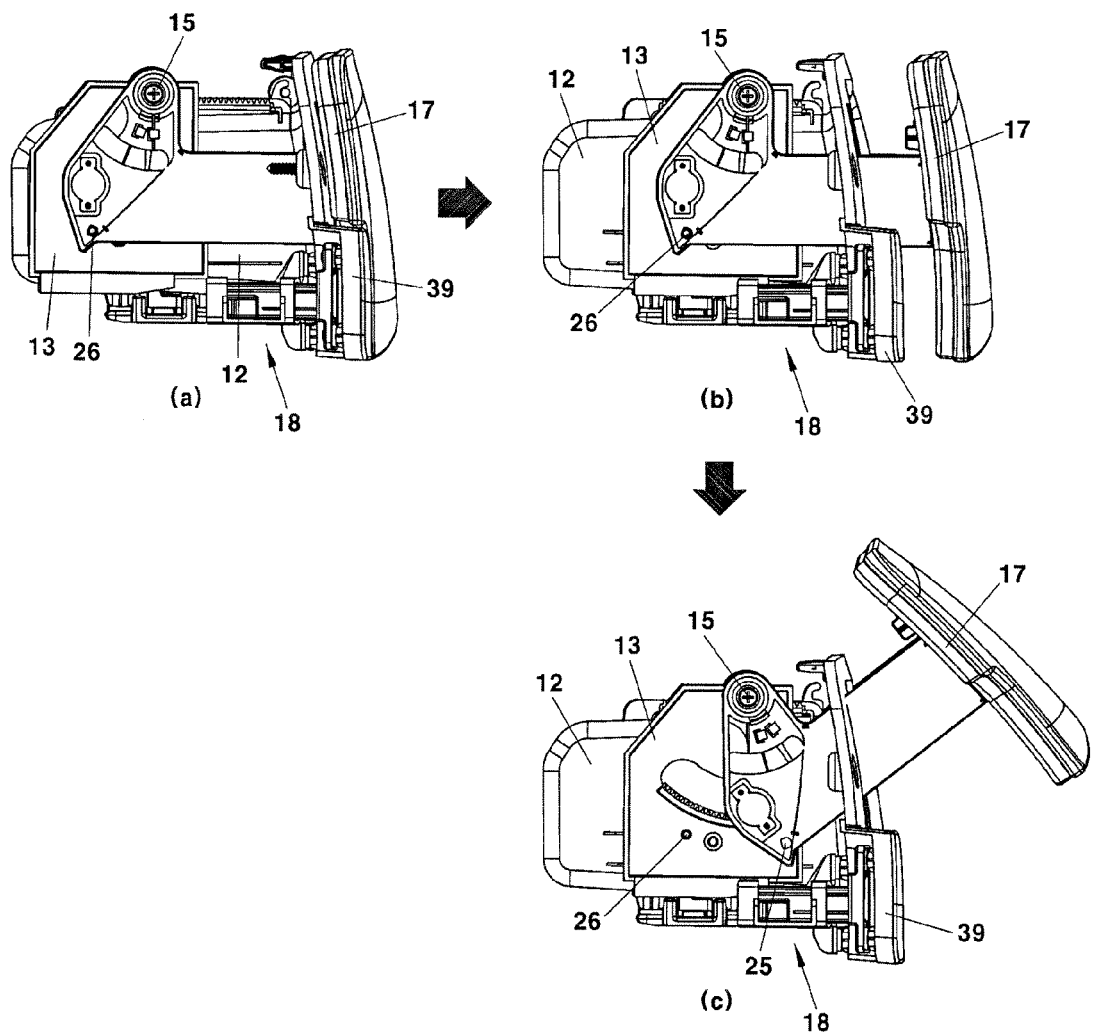
FIG. 9 shows side views of an operation of opening a multibox for vehicles according to an embodiment of the present inventive concept.

FIG. 9 shows side views of an operation of opening a multibox for vehicles according to an embodiment of the present inventive concept.

FIG. 9 shows an opening operation of the multibox.

When a user pushes the knob cover 39 of the knob unit 18 on the front surface of the multibox, the constraint of the sliding plate 13 may be released, when the sliding plate 13 translates to be moved forward and the cover 17 assembled in the sliding plate 13 is projected forward.

Then, since the cover 17 is constrained by the position regulating pin 26, the cover 17 may not be rotated until the translation of the sliding plate 13 is completed.

Additionally, when the translation of the sliding plate 13 is ended and the constraint of the cover 17 is released, the cover 17 may be rotated forward about the hinge unit 15. Accordingly, the multibox is opened so that articles can be introduced into and extracted from the multibox.

When the cover 17 is slightly pushed inward while being pushed down after the use thereof, the position regulating pin 26 of the sliding plate 13 may be stopped by the position regulating aperture 25 in the cover 17 and the cover 17 may be constrained. In contrast, when the stopper boss (not separately shown) of the lock rod (not separately shown) of the knob unit is stopped by the stopper recess (not separately shown) of the lock housing (not separately shown), the sliding plate 13 may be constrained, in which case the cover 17 and the sliding box 13 can maintain their initial reception state.

What is claimed is:

1. A multibox for vehicles, comprising:
   a housing having a receiving space for receiving articles;
   a sliding plate disposed around the housing to translate forward and rearward by a force of a spring of the housing provided by a wound spring;
   a cover finishing a front surface of the receiving space of the housing and supported on the sliding plate by a hinge structure through hinge arms thereof, the cover being rotated upward and downward by a force of a spring provided by a rotation spring;
   a knob unit disposed at one side of a front surface of the housing to lock or unlock the housing and the cover through a pushing operation,
   wherein the multibox is opened and closed by translation of the sliding plate and rotation of the cover; and
   a position regulating pin disposed on the sliding plate and a position regulating aperture into which the position regulating pin is selectively inserted, as a unit for regulating rotation of the cover during the translation of the sliding plate.

2. The multibox of claim 1, wherein the sliding plate comprises guide gears rotatably engaged with gear rails disposed at upper portions of the housing to guide forward and rearward translation of the sliding plate.

3. The multibox of claim 1, wherein the sliding plate comprises a balance shaft and balance gears disposed to opposite ends of the balance shaft and movably engaged with a balance gear rail of the housing as a unit for balancing the sliding plate leftward and rightward during the translation of the sliding plate.

4. The multibox of claim 1, wherein the cover is rotatably engaged with arc-shaped gear rails disposed on a side surface of the sliding plate using guide gears in the hinge arms to be guided during rotation thereof.

5. The multibox of claim 1, wherein the position regulating pin of the sliding plate is moved along a cam guide on a side surface of the housing while contacting the cam guide to be selectively inserted into the position regulating aperture while the position of the position regulating pin varies inward and outward.

6. The multibox of claim 1, wherein the spring for providing a force for translating the sliding plate is the wound spring.

7. The multibox of claim 1, wherein the spring for providing a force for rotating the cover is the rotation spring disposed on a hinge unit of at least one of the hinge arms to have elasticity in one direction.

8. The multibox of claim 1, wherein guide gears in the sliding plate are accommodated in gear housings filled with oil such that a translation speed of the guide gears is slowly controlled.

9. The multibox of claim 1, wherein guide gears in the cover are accommodated in gear housings filled with oil such that a rotation speed of the guide gears is slowly controlled.

10. The multibox of claim 1, wherein the knob unit comprises:
    a knob which is slidable forward and rearward,
    a connecting rod slidable leftward and rightward through contact with the knob,
    a lock rod which is slidable leftward and rightward together with the connecting rod and which constrains the entire sliding plate using a stopper boss stopped by a stopper recess of the sliding plate.

* * * * *